United States Patent
Akada et al.

(10) Patent No.: US 7,230,713 B2
(45) Date of Patent: Jun. 12, 2007

(54) METHOD FOR MEASURING GAP OF LIQUID CRYSTAL CELL

(75) Inventors: Tomohiro Akada, Shiga (JP); Masaya Takizawa, Shiga (JP)

(73) Assignee: Otsuka Electronics Co., Ltd., Osaka (JP)

( * ) Notice: Subject to any disclaimer, the term of this patent is extended or adjusted under 35 U.S.C. 154(b) by 714 days.

(21) Appl. No.: 10/470,015

(22) PCT Filed: Feb. 9, 2001

(86) PCT No.: PCT/JP01/00921

§ 371 (c)(1),
(2), (4) Date: Jul. 23, 2003

(87) PCT Pub. No.: WO02/065053

PCT Pub. Date: Aug. 22, 2002

(65) Prior Publication Data

US 2004/0233432 A1    Nov. 25, 2004

(51) Int. Cl.
*G01N 21/55* (2006.01)
*G01B 11/28* (2006.01)
*G01B 11/06* (2006.01)
(52) U.S. Cl. .................. 356/445; 356/630; 356/632
(58) Field of Classification Search ........ 356/630–632, 356/445–448
See application file for complete search history.

(56) References Cited

U.S. PATENT DOCUMENTS 4,792,227 A    12/1988    Yoshizawa

FOREIGN PATENT DOCUMENTS

| JP | 02-251710 | 10/1990 |
|----|-----------|---------|
| JP | 06-331324 | 12/1994 |
| JP | 11-344312 | 12/1999 |
| JP | 2000-321546 | 11/2000 |

OTHER PUBLICATIONS

H. Ong, "Optical Properties of General Twisted Nematic Liquid-Crystal Displays", Applied Physics Letters, Vol. 51, No. 18, pp. 1398-1400, (Nov. 2, 1987).

*Primary Examiner*—Samuel A. Turner
*Assistant Examiner*—Amanda Merlino
(74) *Attorney, Agent, or Firm*—Finnegan, Henderson, Farabow, Garrett & Dunner, L.L.P.

(57) ABSTRACT

The polarization angle θ1 of a polarizer (14) is set, and the reflection intensity S1 in a cross Nicol state and the reference reflection intensity Ref1 of a liquid crystal cell (15) are measured. A different polarization angle θ2 is then set, and the reflection intensity S2 in a cross Nicol state and the reference reflection intensity Ref2 of the liquid crystal cell are measured. The rations S1/Ref1, S2/Ref2 of measured intensities and the ratio S1·Ref2/S2·Ref1 is determined in order to cancel the background components of the reference reflection intensities Ref1, Ref2 thus determining the value of cell gap accurately.

9 Claims, 8 Drawing Sheets

METHOD FOR MEASURING GAP OF LIQUID CRYSTAL CELL

TECHNICAL FIELD

The present invention relates to a method for measuring the gap of a liquid crystal cell filled with a liquid crystal.

There are transmissive liquid crystal cells illuminated with a backlight from the backside and reflective liquid crystal cells utilizing natural light. The present invention is applicable to both the transmissive and reflective liquid crystal cells.

BACKGROUND ART

A transmissive liquid crystal cell has a structure as shown in FIG. 8, where glass layers 31, 32 constitute the uppermost layer and the lowermost layer, respectively, and transparent electrode films 33, 34 are formed on the inner surfaces of the glass layers 31, 32, respectively. Furthermore, alignment films (not shown) are formed on the inner surfaces of the transparent electrode films 33, 34, which are each rubbed at a predetermined angle. A liquid crystal 15a is sealed in between the alignment films. In the case of a color liquid crystal cell, a color filter is disposed on the (inner surface of the) upper glass layer 31.

FIG. 9 illustrates the structure of a reflective liquid crystal cell. When compared with the transmissive liquid crystal cell, this is different from the transmissive liquid crystal cell in that a reflective metal film 35 is formed in lieu of the transparent electrode 34 on one side. An alignment film is formed on the surface of the reflective metal film 35, which is rubbed at a predetermined angle.

Suppose that the thickness (cell gap) of the liquid crystal contained in a liquid crystal cell is represented by d.

There has been a conventional method for measuring the cell gap d of a liquid crystal cell, in which light is directed from above the cell without liquid crystal injected therein so that interference of light waves is measured to obtain the thickness of the air layer, which is regarded as the thickness of the liquid crystal cell (Interferometry).

However, the thickness of the air layer before injection of the liquid crystal and that of the liquid crystal cell after injection of the liquid crystal are not identical in a strict sense. Accordingly, developing a method for directly measuring the thickness of a cell after injection of a liquid crystal has been anticipated.

Another known method is a method in which the birefringence of uniaxial crystals that liquid crystals have is utilized in such a manner that a linearly polarized component of light of a light source is introduced into a liquid crystal cell filled with a liquid crystal (hereinafter referred to as the "sample"), and the intensity of the transmitted light in a cross Nicol state and the intensity of the same in a parallel Nicol state are each measured. Based on these intensities, a birefringent phase difference (which is called "retardation") of the liquid crystal is determined, from which the cell gap is obtained. (Refer to H. L. Ong, Appl. Phys. Lett. 51 (18), 2 Nov. 1987, pp 1398–1400, etc.)

Incidentally, in the foregoing method, since light is directed to one side of the sample and the light that has been transmitted through the sample is measured, the light source and the photodetector of the measurement system are opposed to each other with respect to the sample. For this reason, a problem arises in that the measurement system has to be large and cannot be compact in size.

In addition, since the foregoing method measures light transmitted through the sample, it is inapplicable, in principle, to reflective liquid crystal cells that do not allow light to pass through.

It is therefore an object of the present invention to provide a method for measuring gap of liquid crystal cell which is capable of measuring the gaps of liquid crystal cells and applicable to both transmissive and reflective liquid crystal cells, while allowing the size of the measurement system to be compact.

DISCLOSURE OF THE INVENTION (1) A method for measuring the gap of a liquid crystal cell according to the present invention comprises the following steps (a)–(e):

(a) a step of measuring a reflection intensity S1 in a cross Nicol state by selecting a component with a polarization angle of $\theta 1$ from light of a light source and introducing the component into a liquid crystal cell prepared as a sample using a polarizer, and passing light reflected from the liquid crystal cell through an analyzer;

(b) a step of measuring a reference reflection intensity Ref1 in a condition where the analyzer is detached by selecting a component with a polarization angle of $\theta 1$ from light of the light source and introducing the component into a reference using the polarizer;

(c) a step of measuring a reflection intensity S2 in a cross Nicol state by selecting a component with a polarization angle of $\theta 2$ from light of the light source and introducing the component into the liquid crystal cell using the polarizer, and passing light reflected from the liquid crystal cell through the analyzer;

(d) a step of measuring a reference reflection intensity Ref2 in a condition where the analyzer is detached by selecting a component with a polarization angle of $\theta 2$ from light of the light source and introducing the component into the reference using the polarizer; and (e) a step of calculating a ratio between the measured intensities S1·Ref2/S2·Ref1 and determining the gap of the liquid crystal cell based on the ratio between the measured intensities S1·Ref2/S2·Ref1.

The "light of the light source" mentioned above may be monochromatic light or polychromatic light (e.g. white light). In the case of monochromatic light, the measurement of the reflection intensity can be effected directly by a photodetector. On the other hand, in the case of polychromatic light, the measurement of reflection intensity is effected by a photodetector via a spectrometer.

Since the measurement of the reference is carried out in a condition where the analyzer is detached in the step (b) above, the reference reflection intensity Ref1 includes a background component. Accordingly, an accurate value of the cell gap is difficult to obtain by merely comparing the ratio between the measured intensities S1/Ref1 with a theoretically determined reflection intensity as usually done.

The present invention is therefore constituted such that two kinds of polarization angles $\theta 1$ and $\theta 2$ are specified, ratios between the measured intensities S1/Ref1, S2/Ref2 are determined, and the ratio S1·Ref2/S2·Ref1 is calculated, thereby canceling the background component included in the reference reflection intensities.

Through this process, good agreement with a ratio between theoretically determined reflection intensities can be achieved, and the value of the cell gap can thus be determined accurately.

(2) Reflection intensities at a cross Nicol state are theoretically determined for a plurality of liquid crystal cells having different cell gaps with the polarization angles set to θ1 and θ2, and the ratio between the measured intensities S1·Ref2/S2·Ref1 is compared with ratios between the theoretically determined reflection intensities (theoretical intensity ratios) so that a value of cell gap corresponding to the closest theoretical intensity ratio is determined to be the gap of the liquid crystal cell.

This method proposes a specific process that uses a plurality of liquid crystal cells in determining the gap of a liquid crystal cell based on the ratio between the measured intensities S1·Ref2/S2·Ref1, in which the ratio S1·Ref2/S2·Ref1 is compared with theoretically determined intensity ratios.

(3) When the reflection intensities S1, Ref1, S2 and Ref2 are each measured in the form of a wavelength spectrum and the theoretical intensities are each calculated in the form of a wavelength spectrum so that a value of cell gap that corresponds to a theoretical intensity ratio that provides the best fit curb is determined as the gap of the liquid crystal cell, the values of cell gaps can be determined more accurately.

In order to obtain wavelength spectra, light of the light source may be passed through a monochrometer before it is incident on the liquid crystal cell, or light reflected by the liquid crystal cell may be passed through a spectrometer.

(4) It is preferred that the liquid crystal cell prepared as a sample is used as the reference.

In the method according to the present invention, the state of polarization of the liquid crystal cell prepared as a sample is predicted and the value of the cell gap is determined according to the prediction. When the analyzer is detached, there is no information on the state of polarization of the liquid crystal cell while the optical characteristics of the sample such as absorption characteristics are included in the reference as they are, so that influences of these optical characteristics are cancelled. The liquid crystal cell can thus be advantageously utilized as a reference.

(5) The liquid crystal cell may be a reflective liquid crystal cell or transmissive liquid crystal cell. In the case of a transmissive liquid crystal cell, light reflected from the bottom surface is measured.

(6) It is preferred that light is incident on the liquid crystal cell at a small angle of incidence ω1 and the light reflected from the liquid crystal cell at an angle of reflection of ω2 is measured.

Although it is more preferable that ω1=ω2=0 degrees, so long as w1<10 degrees and w2<10 degrees, reflection intensities can be measured without any problem.

BEST MODE FOR CARRYING OUT THE INVENTION

1. Liquid Crystal Cell Gap Measurement System

Figure 1:
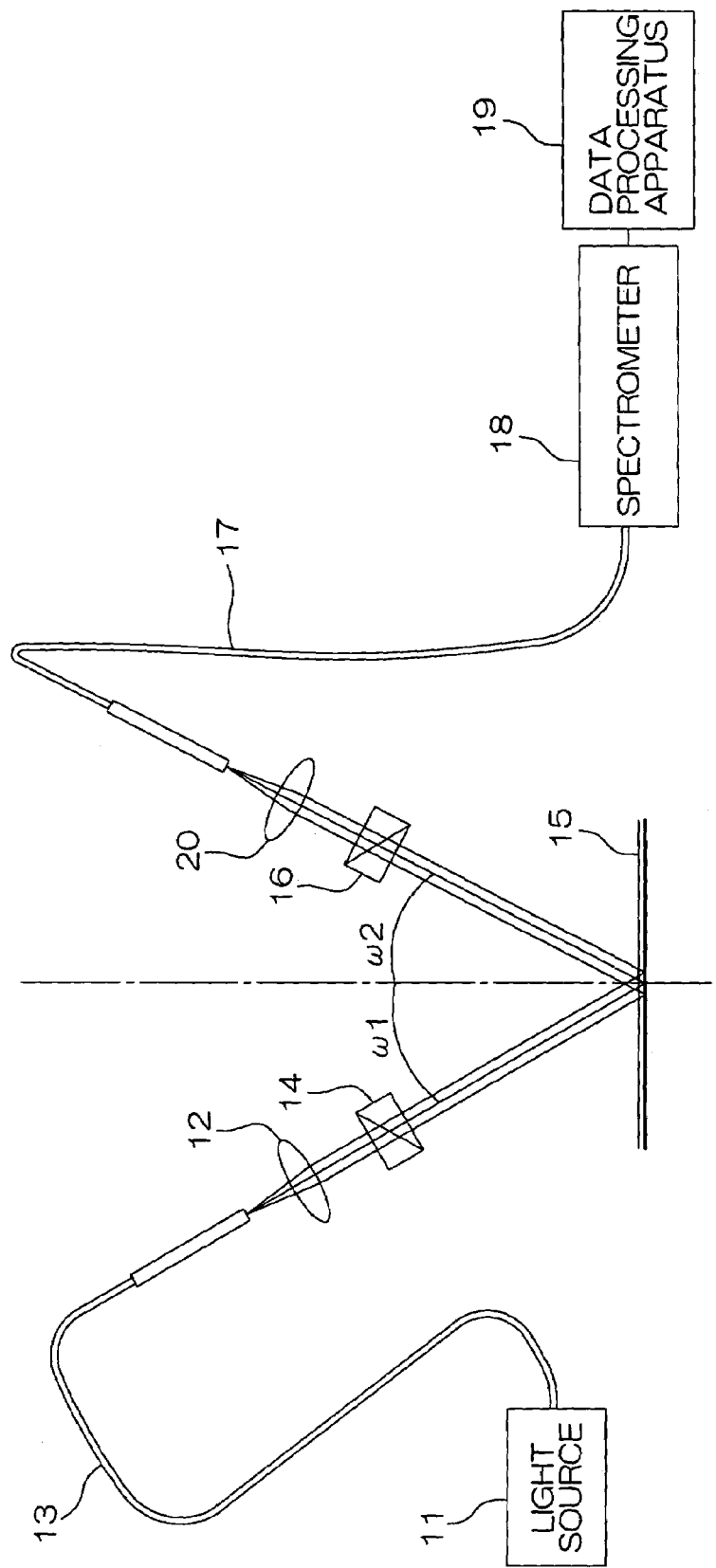
FIG. 1 illustrates a general configuration of a liquid crystal cell gap measurement system.

FIG. 1 illustrates a general configuration of a liquid crystal cell gap measurement system.

The measurement system comprises a light source 11 such as a halogen lamp, an input fiber 13 for guiding light of the light source 11, a lens 12 for collimating light rays from the input fiber 13, a polarizer 14 at which light rays are linearly polarized, a liquid crystal cell 15 prepared as a sample, an analyzer 16 for selecting linearly polarized light rays from light rays reflected from the liquid crystal cell 15, a lens 20 for converging light rays that have passed through the analyzer 16, an output fiber 17 for guiding the converged light, a spectrometer 18, and a data processing apparatus 19 including a computer housed therein.

The angle of incidence ω1 of light incident on the liquid crystal cell 15 and the angle of reflection ω2 of light reflected from the liquid crystal cell 15 are both fixed. Normally, ω1=ω2 (under a total reflection condition). Preferably, ω1 and ω2 are within 10 degrees, and these values are set to 6 degrees in this embodiment.

The liquid crystal cell 15 may be a reflective liquid crystal cell or a transmissive liquid crystal cell. Even in the case of a transmissive liquid crystal cell, light rays that are reflected from the bottom surface of the liquid crystal cell 15a are measured.

The aforementioned polarizer 14 is provided so as to be rotatable by a motor (not shown) to any desired angle. The aforementioned analyzer 16 is provided so as to be rotatable by a motor (not shown) to any desired angle and in an automatically attachable and detachable manner. Let the angle of rotation of the polarizer 14 be represented by θ, and the angle of rotation of the analyzer 16 be represented by γ. Since these are always used in a cross Nicol state in the present invention, the following equation is established between them:

θ=γ±90 deg.

Suppose the twist angle of the liquid crystal 15a is φ. Then the difference Δn between an extraordinary index of refraction ne and an ordinary index of refraction no is expressed as the equation below(where ABS represents an absolute value), and the retardation is Δnd.

$$\Delta n = ABS(ne-no) \qquad (1)$$

Figure 2:
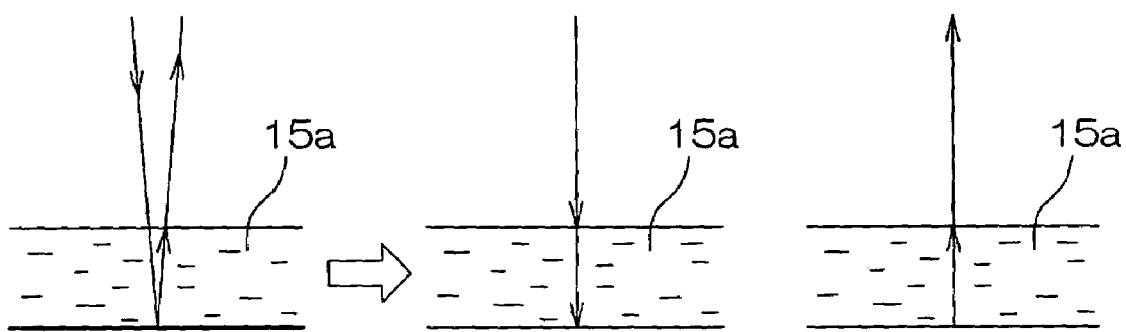
FIG. 2 illustrates optical paths of light when it is incident on a liquid crystal cell 15a and reflected from the bottom surface, and then directed outward.

FIG. 2 illustrates optical paths of light when it is incident on a liquid crystal cell 15a and reflected from the bottom surface, and then directed outward. In the present invention, the liquid crystal cell 15 is assumed to comprise two transmissive cells stacked together.

Light undergoes a twist angle φ and a retardation Δnd while it passes through the inward path.

When i denotes an imaginary unit and λ denotes a wavelength of light, this phenomenon is expressed by a Jones matrix J as follows:

$$J(\phi, \Delta nd, \lambda) = \begin{pmatrix} p+i\cdot q & r+i\cdot s \\ -r+i\cdot s & p-i\cdot q \end{pmatrix} \quad (2)$$

where

=cos φ cos β1+sin φ sin β/$\sqrt{1+\alpha^2}$
q=cos φ sin β·α/$\sqrt{1+\alpha^2}$
r=−sin φ cos β+cos φ sin β/$\sqrt{1+\alpha^2}$
s=sin φ sin β·α/$\sqrt{1+\alpha^2}$
α=πΔnd/λφ
β=φ$\sqrt{1+\alpha^2}$ In addition, light undergoes a twist angle −φ and a retardation Δnd while it passes through the outward path. The Jones matrix J to express this phenomenon is identical to the formula (2) with negated symbols of twist angle φ.

The Jones matrix for the polarizer and that for the analyzer are expressed as follows:

$$\text{Polarizer }(\theta) = \begin{pmatrix} \cos\theta \\ \sin\theta \end{pmatrix} \quad (3)$$

$$\text{Analyzer }(\gamma) = \begin{pmatrix} \cos\gamma & 0 \\ 0 & siin\gamma \end{pmatrix} \quad (4)$$

The state of polarization of reflected light E is described as follows:

E=analyzer(γ)·rotator(φ)·outward path J(−φ,Δnd)·rotator(−φ)·inward path J(φ, Δnd)·polarizer(θ)

where the rotator (φ) and rotator (−φ) are operators to cancel the twist that the light underwent in the liquid crystal 15a. The Jones matrix for the rotator (φ) is expressed as follows:

$$\text{Rotator }(\phi) = \begin{pmatrix} \cos\theta & -\sin\phi \\ \sin\theta & \cos\phi \end{pmatrix} \quad (5)$$

Intensity reflectance can be theoretically obtained by calculating EE*. The asterisk "*" indicates that the complex conjugate is taken.

2. Simulation of Intensity Reflectance

Differences of refractive index Δn and data of twist angle φ of the measurement target liquid crystal at two or more wavelengths are input in the data processing apparatus 19. The angle of rotation (θ) of the polarizer 14, the angle of rotation of the analyzer 16 (γ) are set in the following two modes (a), (b):

(a) θ=0 deg., γ=−90 deg.
(b) θ=−45 deg., γ=−135 deg.

With the liquid crystal cell gap d being set to a plurality of values, an intensity reflectance EE* is calculated as a function of the wavelength λ for each of (a) and (b). These are denoted by EE*0(λ) and EE*45(λ), respectively. Then, the ratio C theo(λ) between the two intensity reflectances EE*0(λ) and EE*45(λ)is calculated:

C theo(λ)=EE*0(λ)/EE*45(λ)

The ratio C theo(λ) is displayed as a group of curves in which the liquid crystal cell gap d is the parameter.

3. Method for Measuring Intensity Reflectance 3.1. Measurement of Reference

Since there are influences included such as various characteristics of the measuring system (emission characteristics of the light source, transmittance of the optical system, sensitivity of the photodetector, wavelength characteristics of those and temporal variations of the same, etc.), and light reflection from various layers (referred to as the "background component") other than light reflection during the inward and outward travel in the liquid crystal layers, certain standardizing processing is necessary.

Generally, such standardizing processing is performed by measuring the reflection intensity of a reference and dividing a measured reflection intensity of the sample by the former.

In the present invention, the reference measuring arrangement is so constructed that the liquid crystal cell 15 is disposed as in the sample measuring arrangement but the analyzer 16 is removed.

Figure 3:
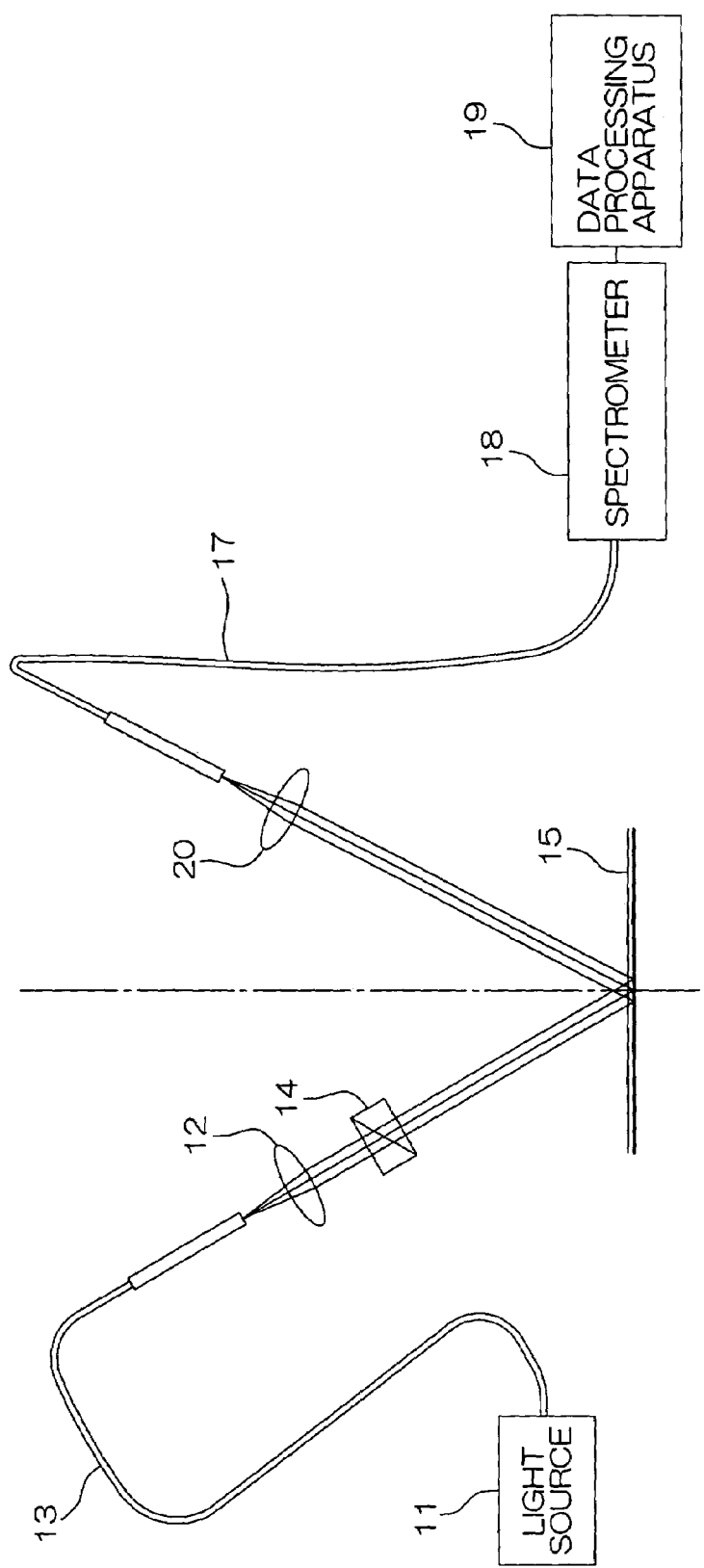
FIG. 3 illustrates a general configuration of a liquid crystal cell gap measurement system where a reference is measured with the analyzer being removed.

FIG. 3 illustrates a mode of the reference measurement.

With this arrangement, the light measured on the reference includes information on various characteristics of the measuring system, which can be eliminated from the result of measuring the sample as later described.

However, contrary to the case where the analyzer 16 is attached, because of the removal of the analyzer 16, the background component is included in this case. This background component is hereinafter denoted by $Ref_b$.

The light measured on the reference Ref is expressed using subscripts s and b as the sum of the component $Ref_s$ including information on various characteristics of the measuring system and the background component $Ref_b$ as follows:

$Ref_s + Ref_b$

With the angle of rotation θ of the polarizer 14 set in the two modes (a) and (b) below, reflection intensities Ref0 and Ref45 of the liquid crystal cell 15 used as the reference are measured at a plurality of wavelengths λi (where i=1, 2. 3, . . . , n; n is an integer that is two or more.)

(a) θ=0 deg.
(b) θ=−45 deg.

The reflection intensities Ref0 and Ref45 can each be expressed using subscripts s and b as follows:

$Ref0(\lambda i) = Ref0_s(\lambda i) + Ref0_b(\lambda i)$ (6)

$Ref45(\lambda i) = Ref45_s(\lambda i) + Ref45_b(\lambda i)$ (7)

3.2. Measurement of Sample

With the liquid crystal 15 serving as the sample being placed and the analyzer 16 being attached, the angle of rotation θ of the polarizer 14 and the angle of rotation γ of the analyzer are set in the two modes (a) and (b) below, and the reflection intensities S0, S45 of the liquid crystal cell 15 are measured at aforementioned wavelengths λi.

(a) θ=0 deg., γ=−90 deg.
(b) θ=−45 deg., γ=−135 deg.

Then, the measured reflection intensities S0(λi) and S45(λi) are divided by the reflection intensities of the reference Ref0($\lambda$i)and Ref45($\lambda$i), respectively. The values resulted from the division are written as R0($\lambda$i), R45($\lambda$i), respectively. R0($\lambda$i)and R45($\lambda$i) are expressed as follows:

$$R0(\lambda i)=S0(\lambda i)/\text{Ref}0(\lambda i)=S0(\lambda i)/(\text{Ref}0_s(\lambda i)+\text{Ref}0_b(\lambda i)) \quad (8)$$

$$R45(\lambda i)=S45(\lambda i)/\text{Ref}45(\lambda i)=S45(\lambda i)/(\text{Ref}45_s(\lambda i)+\text{Ref}45_b(\lambda i)) \quad (9)$$

Then, the ratio C($\lambda$i) between R0($\lambda$i)and R45($\lambda$i) is taken:

$$C(\lambda i)=R0(\lambda i)/R45(\lambda i)=[S0(\lambda i)/S45(\lambda i)]\times[(\text{Ref}45_s(\lambda i)+\text{Ref}45_b(\lambda i))/(\text{Ref}0_s(\lambda i)+\text{Ref}0_b(\lambda i))] \quad (10)$$

In the second parentheses [ ] in the right-hand side of the ratio C($\lambda$i), the background component Ref45$_b$($\lambda$i) and background component Ref0$_b$($\lambda$i)) are included in the numerator and denominator, respectively. When the angles $\omega$ are such small values as $\omega 1<10$ deg. and $\omega 2<10$ deg., it is possible to assume that the ratio between Ref45$_s$($\lambda$i)and Ref45$_b$($\lambda$i) and the ratio between Ref0$_s$($\lambda$i)and Ref0$_b$($\lambda$i) are identical, and therefore the inside of the second parentheses [ ] can be substituted with Ref45$_s$($\lambda$i)/Ref0$_s$($\lambda$i).

Accordingly, by dividing S0($\lambda$i) by Ref0$_s$($\lambda$i), and dividing S45($\lambda$i)by Ref45$_s$($\lambda$i), the ratio C($\lambda$i) provides a true ratio between reflection intensities of the sample where the background component is eliminated.

4. Determination of the Cell Gap

A graph of ratio C($\lambda$i) obtained by actually measuring the liquid crystal cell 15 is fitted to graphs (which comprise a plurality of graphs using liquid crystal cell gap d as the parameter)showing ratio C theo($\lambda$) obtained by the simulation of intensity reflectance so that the best fit cell gap d is determined. For the fitting method, a known method such as the nonlinear least squares method may be used.

5. Example

The reference angle was set to 0 deg. and the clockwise direction was defined as positive (+) angle. Reflection intensities of a twist nematic transmissive liquid crystal cell were measured by using a liquid crystal cell gap measurement system according to the present invention (reflection mode). The measurements were carried out at five positions.

The rubbing direction of the surface of the transmissive liquid crystal cell was set at −60 deg. and the twist angle from the surface to the bottom of the cell was −240 deg.

Values of extraordinary index of refraction ne and ordinary index of refraction no were known and as listed in Table 1. Index of refraction is a function of wavelength. In reality, only indices of refraction for a limited plural number of wavelengths are known. The indices of refraction for other wavelengths are interpolated by using Cauchy's formula.

The Cauchy's formula is described as follows. Where there is only data of index of refraction for one wavelength, the index of refraction is treated as a fixed value. Where there are data of index of refraction for two wavelengths, interpolation by a quadratic function of the wavelengths is performed. Where there are data of index of refraction for three wavelengths, interpolation by a quartic function of the wavelengths is performed.

TABLE 1

| WAVELENGTH | 450 nm | 550 nm | 650 nm |
|---|---|---|---|
| Ne | 1.6293 | 1.6276 | 1.6272 |
| No | 1.4849 | 1.4947 | 1.4997 |

The angle of rotation $\theta$ of the polarizer 14 and the angle of rotation $\gamma$ of the analyzer 16 were set in the two modes (a), (b) below.

(a) $\theta$=0 deg., $\gamma$=−90 deg.
(b) $\theta$=−45 deg., $\gamma$=−135 deg.

Then, reflection intensity spectra R0($\lambda$i) and R45($\lambda$i) were measured and the ratio C($\lambda$i) was calculated. (See the foregoing formulae (8)–(10).)

Meanwhile, with the conditions being the same, an intensity reflectance EE* of the transmissive liquid crystal cell was calculated as a function of wavelength $\lambda$. Then, the ratio C theo($\lambda$)between the two intensity reflectances obtained in the two cases (a) and (b) was calculated.

The ratio C ($\lambda$) between actually measured values and the calculated ratio C theo($\lambda$) were compared with each other at five points 1–5 to give liquid crystal cell gaps d at the five points 1–5.

Subsequently, a transmissive liquid crystal cell was situated in a cross Nicol state and a parallel Nicol state using a conventional transmissive optical system, and the intensity of transmitted light (wavelength of 550 nm) was measured at the same five points 1–5 (transmissive mode).

A retardation $\Delta$nd was determined based on the ratio between the intensities, and it was divided by the difference of refractive index $\Delta$n at a wavelength of 550 nm so as to obtain a liquid crystal cell gap d.

The liquid crystal cell gaps d obtained in the reflective mode and transmissive mode described above are listed for the individual points in Table 2.

TABLE 2

|  | TRANSMISSIVE MODE | REFLECTIVE MODE |
|---|---|---|
| POINT 1 | 6.275 | 6.269 |
| POINT 2 | 6.292 | 6.294 |
| POINT 3 | 6.331 | 6.321 |
| POINT 4 | 6.353 | 6.341 |
| POINT 5 | 6.424 | 6.406 |

UNIT: μm

Figure 4:
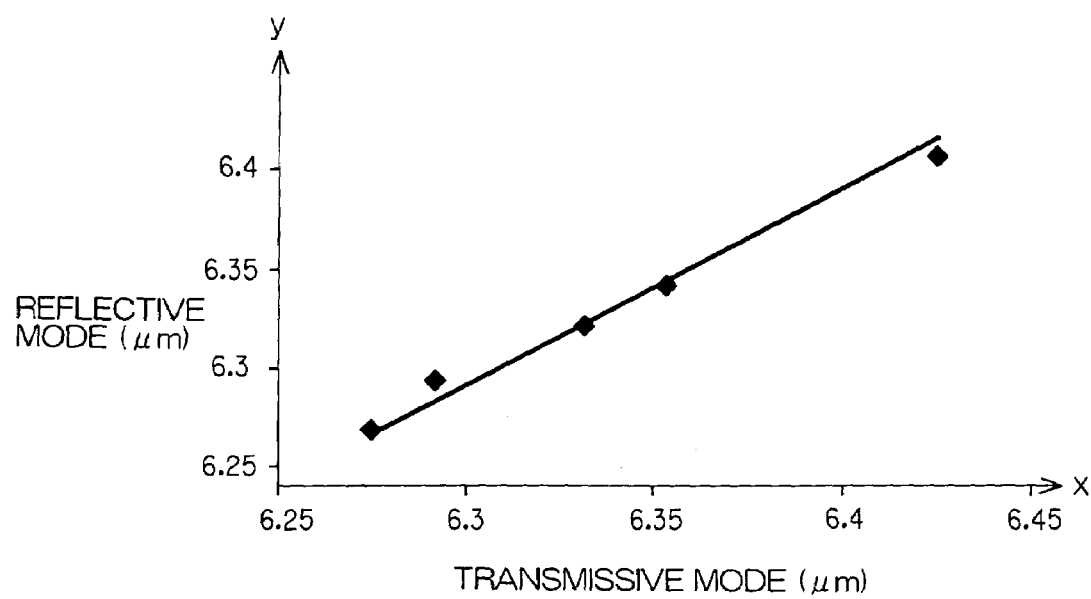
FIG. 4 is a graph showing a result of plotting liquid crystal cell gaps d measured in a reflective mode and a transmissive mode.

FIG. 4 shows the result obtained when the respective liquid crystal cell gaps d measured in the reflective mode and transmissive mode were graphed. From the graph, it is obvious that the respective crystal cell gaps d obtained in the two modes are reproduced with very high correlation. The correlation coefficient $R^2$ when the intercept is equal to zero is 0.9802.

Figure 5:
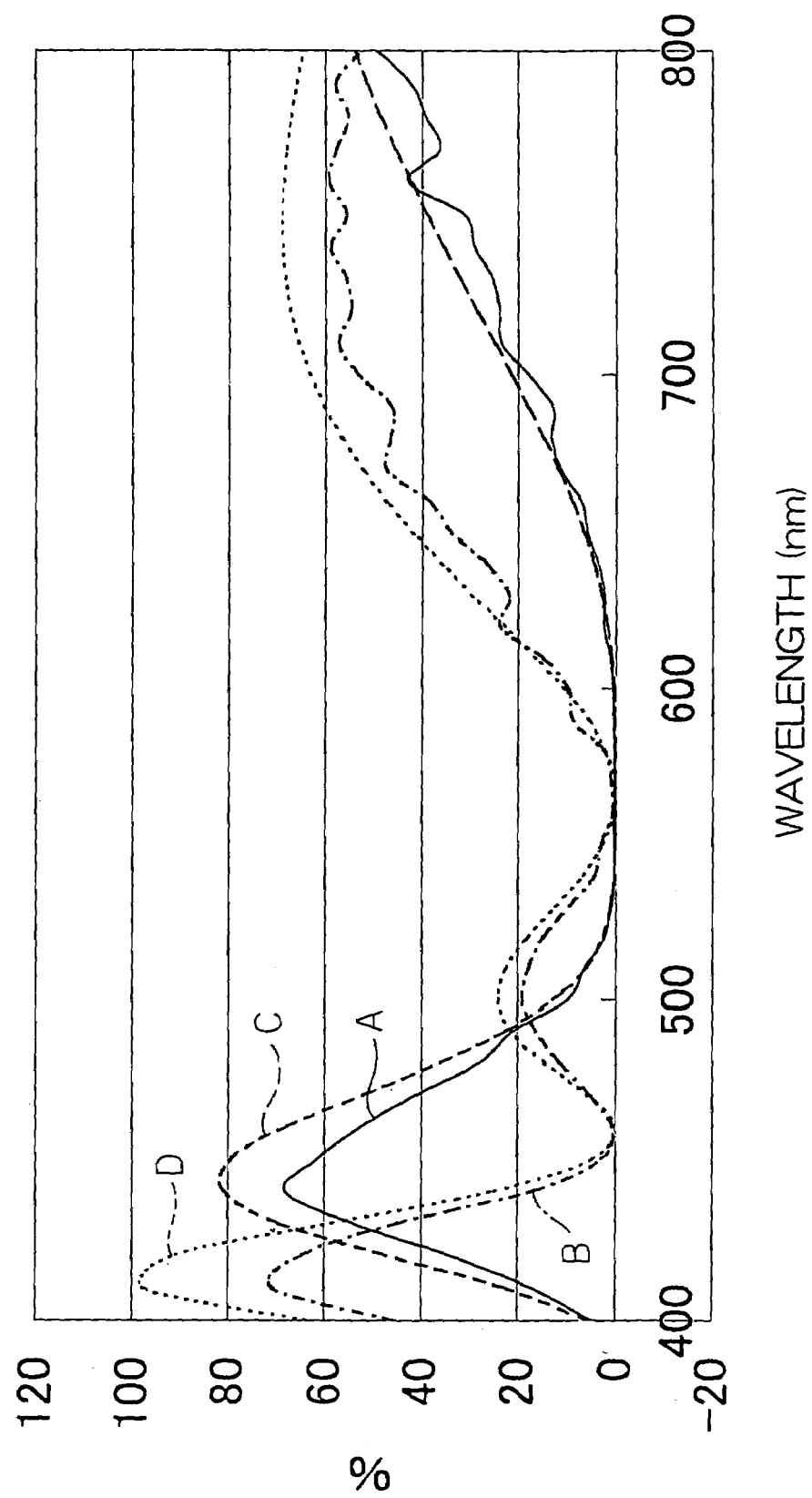
FIG. 5 shows graphs where actually measured reflection intensity spectra R0(λi), R45(λi) are each graphed as a function of wavelength, and theoretical values of intensity reflectance EE*0 (λ), EE*45 (λ) are plotted in an overlay manner.

Subsequently, as shown in FIG. 5, actually measured reflection intensity spectra R0($\lambda$i) and R45($\lambda$i) at point 5 were each graphed as a function of wavelength, and theoretical values of intensity reflectance EE*0($\lambda$)and EE*45($\lambda$) in the two angle settings (a) and (b) were plotted and displayed in overlay.

Measured reflection intensity spectrum R0($\lambda$i): Graph A
Measured reflection intensity spectrum R45($\lambda$i): Graph B
Theoretical value of intensity reflectance EE*0($\lambda$): Graph C
Theoretical value of intensity reflectance EE*45($\lambda$): Graph D As is apparent from FIG. 5, the measured reflection intensity spectrum R0($\lambda$i) (graph A) cannot be seen as corresponding to the theoretical value EE*0($\lambda$)(graph C). The measured reflection intensity spectrum R45($\lambda$i)(graph B)cannot be seen as corresponding to the theoretical value EE*45($\lambda$)(graph D), either.

Figure 6:
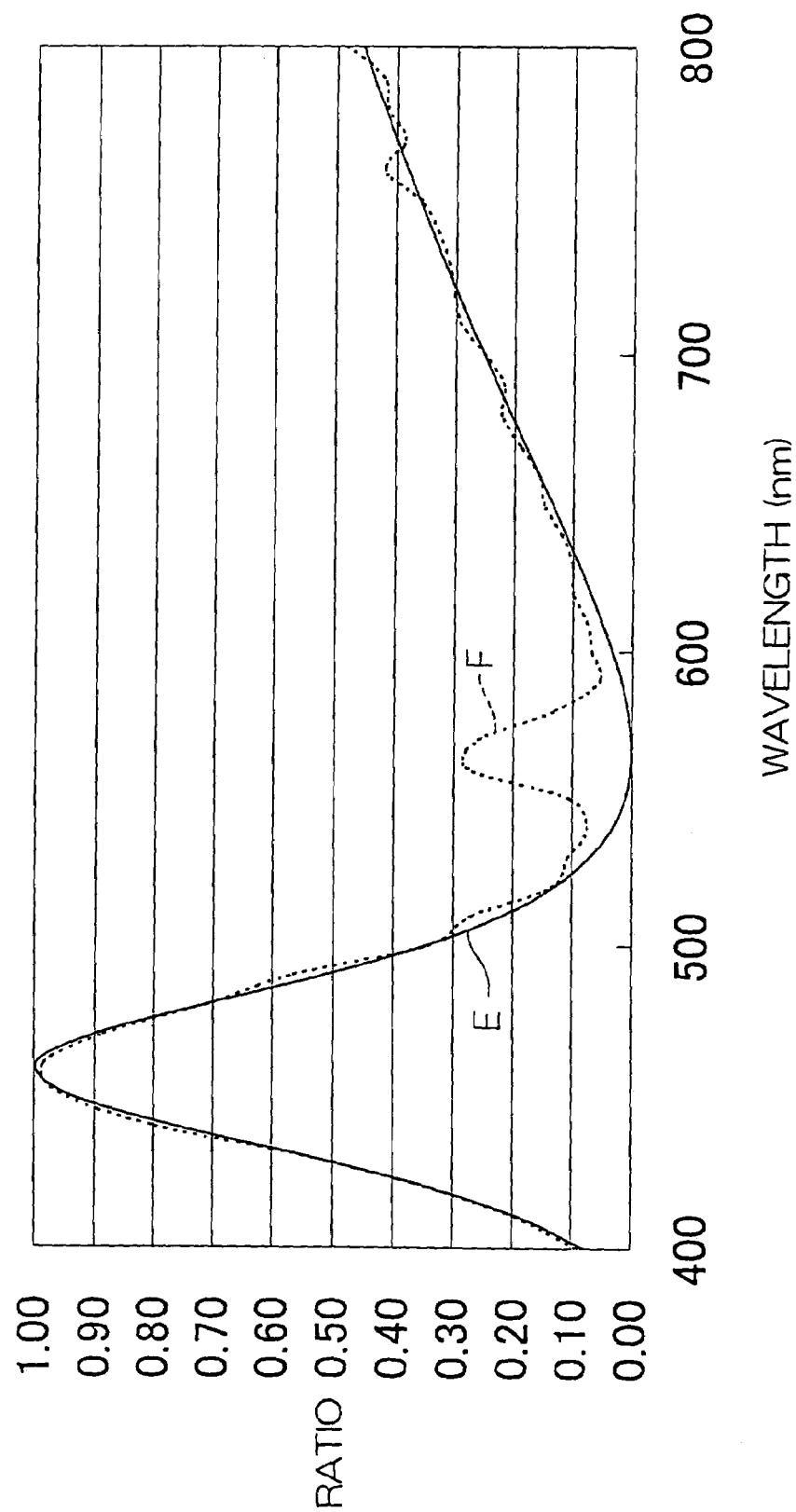
FIG. 6 is a graph showing a result of calculation of the ratio C theo(λ)between two intensity reflectances EE*0(λ) and EE*45(λ), which is plotted together with the ratio C(λi)between measured reflection intensity spectra R0(λi) and R45(λi).

Subsequently, the ratio C theo($\lambda$)between the two intensity reflectances EE*0($\lambda$) and EE*45($\lambda$) was calculated and graphed together with the ratio $C(\lambda i)$ between actually measured reflection intensity spectra $R0(\lambda i)$ and $R45(\lambda i)$ as shown in FIG. 6.

C theo($\lambda$): Graph E
C($\lambda i$): Graph F

As is apparent from FIG. 6, the two graphs E and F correspond to each other with very good precision. Incidentally, the tiny peak appearing around the wavelength 550 nm is considered to be a noise, because the ratio where the reflection intensity spectrum was about 0% was calculated where the peak appears.

6. Example of Modification

Meanwhile, the implementation of the present invention is not limited to the foregoing embodiment. In the previous description, the angle of rotation ($\theta$) of the polarizer 14 and the angle of rotation of the analyzer 16 ($\gamma$) are set in the two modes (a),(b) below:

(a) $\theta$=0 deg., $\gamma$=-90 deg.
(b) $\theta$=-45 deg., $\gamma$=-135 deg.

However, the angles may be different from the above listed ones, for example, (b) above may be substituted with (b') below:

(b') $\theta$=-30 deg., $\gamma$=-120 deg.

In addition, while the light source 11 and spectrometer 18 are employed in the foregoing cell gap measurement system as means to obtain wavelength spectra, instead of this combination, the light source 11 and a monochrometer 12 may be used.

In the structures shown in FIGS. 1 and 3, the angle of incidence 11 of light incident on the liquid crystal cell 15 and the angle of reflection $\omega 2$ of light reflected from the liquid crystal cell 15 are set to finite values other than 0. However, it is possible to set both of $\omega 1$ and $\omega 2$ to 0 degrees.

Figure 7:
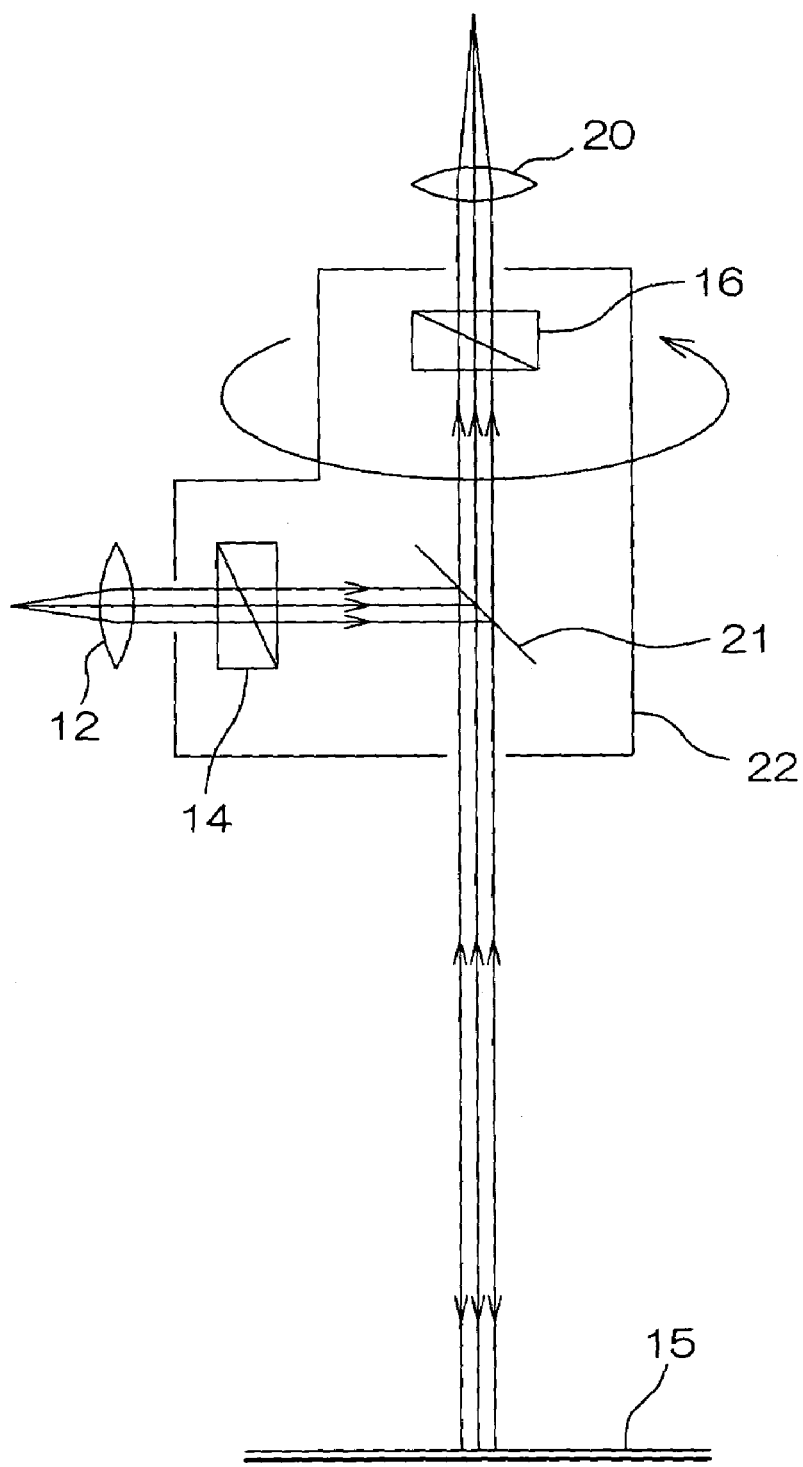
FIG. 7 illustrates a general configuration of a liquid crystal cell gap measurement system arranged so that the angle of incidence of light incident on a liquid crystal cell 15 and the angle of reflection of the light reflected from the liquid crystal cell 15 are both 0 degrees.
Figure 8:
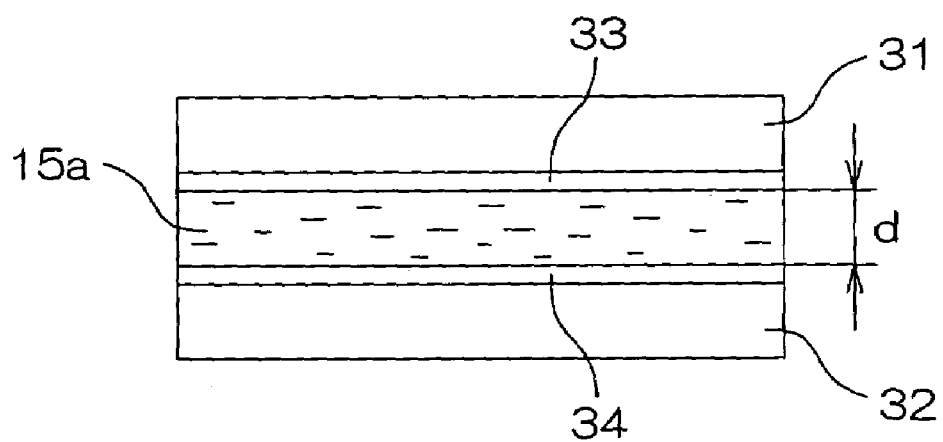
FIG. 8 illustrates the structure of a transmissive liquid crystal cell.
Figure 9:
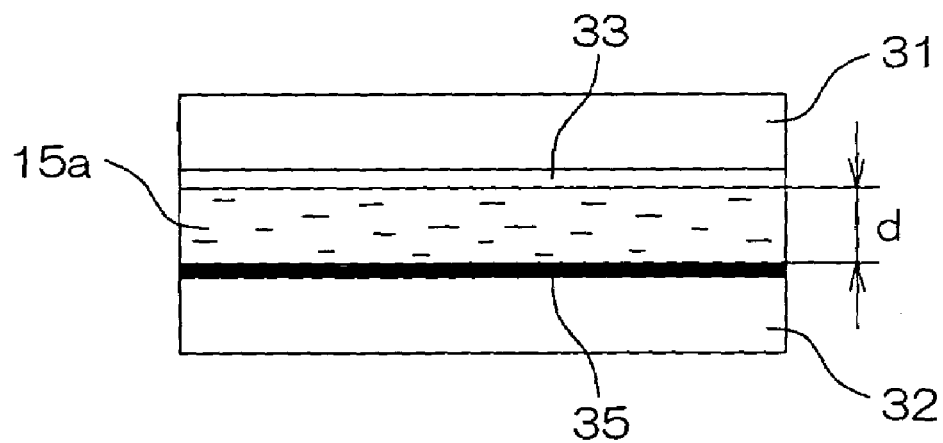
FIG. 9 illustrates the structure of a reflective liquid crystal cell.

FIG. 7 illustrates the configuration of a liquid crystal cell gap measurement system where $\omega 1$ and $\omega 2$ are set to 0 degrees.

Parallel light rays that emerge from a lens 12 are introduced into a liquid crystal cell 15 through a polarizer 14 and a half mirror 21 (non-polarized beam splitter) so as to be incident normal to the liquid crystal cell 15.

Light rays reflected from the liquid crystal cell 15 pass through the half mirror 12 to be directed to an analyzer 16 and lens 20.

The aforementioned polarizer 14, half mirror 12 and analyzer 16 are secured by means of a frame component 22 and are adapted to be integrally rotatable about an axis that is perpendicular to the surface of the prepared liquid crystal cell 15. Incidentally, the polarization angle of the polarizer 14 is fixed to be horizontal (perpendicular to the length of the sheet), and the polarization angle of the analyzer 16 is fixed to be horizontal (parallel to the length of the sheet). The analyzer is detachable.

With this arrangement, the angle of incidence of light incident on the liquid crystal cell 15 and the angle of reflection of light reflected from the liquid crystal cell 15 can be both kept at 0 degrees.

The invention claimed is:

1. A method for measuring the gap of a liquid crystal cell comprising the steps of:

(a) a step of measuring a reflection intensity S1 in a cross Nicol state by passing a light with a polarization angle of $\theta 1$ of a polarizer from a light source and introducing the light into a liquid crystal cell prepared as a sample, and passing light reflected from the liquid crystal cell through an analyzer;

(b) a step of measuring a reference reflection intensity Ref1 in a condition where the analyzer is detached, and passing a light with a polarization angle of $\theta 1$ of the polarizer from the light source and introducing the light into a reference;

(c) a step of measuring a reflection intensity S2 in a cross Nicol state by passing a light with a polarization angle of $\theta 2$ of the polarizer from the light source and introducing the light into a liquid crystal cell, and passing light reflected from the liquid crystal cell through the analyzer;

(d) a step of measuring a reference reflection intensity Ref2 in a condition where the analyzer is detached, and passing a light with a polarization angle of $\theta 2$ of the polarizer from the light source and introducing the light into the reference; and (e) a step of calculating a ratio between the measured intensities S1·Ref2/S2·Ref1; and (f) comparing the ratio between the measured intensities S1·Ref2/S2·Ref1 with ratios between theoretically determined reflection intensities so that a value of cell gap corresponding to the closest theoretical intensity ratio is determined to be the gap of the liquid crystal cell; (g) storing the gap of the liquid crystal cell in a memory of a data processor.

2. The method for measuring the gap of a liquid crystal cell according to claim 1, wherein reflection intensities at a cross Nicol state are theoretically determined for a plurality of liquid crystal cells having different cell gaps with the polarization angles set to $\theta 1$ and $\theta 2$.

3. The method for measuring the gap of a liquid crystal cell according to claim 2, wherein the reflection intensities S1, Ref1, S2, and Ref2 are each measured in the form of a wavelength spectrum and the theoretical intensities are each calculated in the form of a wavelength spectrum so that a value of cell gap corresponding to a theoretical intensity ratio that provides the best fit curve is determined to be the gap of the liquid crystal cell.

4. The method for measuring the gap of a liquid crystal cell according to claim 1, wherein the liquid crystal cell prepared as a sample is used as the reference.

5. The method for measuring the gap of a liquid crystal cell according to claim 1, wherein the liquid crystal cell is a reflective liquid crystal cell.

6. The method for measuring the gap of a liquid crystal cell according to claim 1, wherein the liquid crystal cell is a transmissive liquid crystal cell.

7. The method for measuring the gap of a liquid crystal cell according to claim 1, wherein light is introduced to be incident at an angle of $\omega 1$ on the liquid crystal cell prepared as a sample and light that is reflected from the liquid crystal cell at a reflection angle of $\omega 2$ is measured.

8. The method for measuring the gap of a liquid crystal cell according to claim 7, wherein $\omega 1$<10 deg. and $\omega 2$<10 deg.

9. The method for measuring the gap of a liquid crystal cell according to claim 7, wherein $\omega 1$=0 deg. and $\omega 2$=0 deg.

* * * * *

UNITED STATES PATENT AND TRADEMARK OFFICE
CERTIFICATE OF CORRECTION

PATENT NO. : 7,230,713 B2 Page 1 of 1
APPLICATION NO. : 10/470015
DATED : June 12, 2007
INVENTOR(S) : Tomohiro Akada et al.

It is certified that error appears in the above-identified patent and that said Letters Patent is hereby corrected as shown below:

Claim 1, column 10, line 17, after "reference ;" delete "and".

Claim 1, column 10, line 19, after "S1 • Ref2/S2 • Ref1;" delete "and".

Claim 1, column 10, line 26, after "cell ;" insert --and--.

Signed and Sealed this

Sixth Day of May, 2008

JON W. DUDAS
*Director of the United States Patent and Trademark Office*